United States Patent
Courtay et al.

(10) Patent No.: US 8,239,485 B2
(45) Date of Patent: Aug. 7, 2012

(54) SYSTEM, SHARING NODE, SERVER, AND METHOD FOR CONTENT DISTRIBUTION

(75) Inventors: Olivier Courtay, Rennes (FR); Olivier Heen, Domloup (FR); Niclas Stahl, Sartrouville (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 12/737,131

(22) PCT Filed: Jun. 16, 2009

(86) PCT No.: PCT/EP2009/057487
§ 371 (c)(1),
(2), (4) Date: Dec. 10, 2010

(87) PCT Pub. No.: WO2010/003786
PCT Pub. Date: Jan. 14, 2010

(65) Prior Publication Data
US 2011/0093561 A1    Apr. 21, 2011

(30) Foreign Application Priority Data
Jun. 17, 2008   (EP) .................................... 08305275

(51) Int. Cl.
 *G06F 15/16*    (2006.01)
(52) U.S. Cl. .................... 709/217; 709/219; 707/622
(58) Field of Classification Search .................. 709/201, 709/203, 217, 219; 707/622
See application file for complete search history.

(56) References Cited

U.S. PATENT DOCUMENTS

| | | | | |
|---|---|---|---|---|
| 7,680,067 B2* | 3/2010 | Prasad et al. | ................... | 370/254 |
| 7,738,503 B2* | 6/2010 | Goyal et al. | ................... | 370/503 |
| 8,131,673 B2* | 3/2012 | Chavez et al. | ................ | 707/622 |
| 2002/0194256 A1* | 12/2002 | Needham et al. | ............. | 709/201 |

(Continued)

FOREIGN PATENT DOCUMENTS
EP       1898599       3/2008
(Continued)

OTHER PUBLICATIONS

Massoulié et al., Peer Counting and Sampling in Overlay Networks: Random Walk Methods., Proceedings of the twenty-fifth annual ACM symposium on Principles of distributed computing., pp. 123-132., ACM New York, NY, USA 2006.*

(Continued)

*Primary Examiner* — Wing Chan
*Assistant Examiner* — Kostas Katsikis
(74) *Attorney, Agent, or Firm* — Jack Schwartz & Associates, PLLC (57) ABSTRACT

A system for distribution of a content item in a network, particularly a peer-to-peer network. A requesting node sends a request for the content item. An access requirement value for the content item is compared to a counter value for the requesting node to determine if the requesting node may download the content item from a sharing node. The counter value is advantageously linked to the requesting node's habit of sharing content items. The access requirement value, which preferably is not only linked to the size of the content item, is modified for at least one content item in the network, either following a time rule or when the content is downloaded. In this way it can be ensured that initial downloaders are likely to share the content item and that the content then gets more accessible to other nodes.

11 Claims, 4 Drawing Sheets

U.S. PATENT DOCUMENTS

| | | | |
|---|---|---|---|
| 2004/0128013 A1* | 7/2004 | Blawat et al. | 700/100 |
| 2005/0120133 A1* | 6/2005 | Slack-Smith | 709/234 |
| 2008/0065771 A1* | 3/2008 | Marvit et al. | 709/226 |
| 2008/0089299 A1* | 4/2008 | Lindsley et al. | 370/338 |
| 2009/0106425 A1* | 4/2009 | Zuckerman et al. | 709/226 |
| 2009/0177792 A1* | 7/2009 | Guo et al. | 709/231 |

FOREIGN PATENT DOCUMENTS

| | | |
|---|---|---|
| WO | WO2008002295 | 1/2008 |

OTHER PUBLICATIONS

Tan et al., "A Payment-based Incentive and Service Differentiation Mechanism for Peer-to-Peer Streaming Broadcast", 2006 IEEE.

Guo et al., "PONDER: Performance Aware P2P Video-on-Demand Service", IEEE Globecom 2007 Poceedings, 2007.

Liu et al., "A Survey on Peer-to-Peer Video Streaming Systems", Business Media, LLC 2008, Jan. 10, 2008.

Search Report Dated Jun. 29, 2010.

* cited by examiner

SYSTEM, SHARING NODE, SERVER, AND METHOD FOR CONTENT DISTRIBUTION

This application claims the benefit, under 35 U.S.C. §365 of International Application PCT/EP09/057,487, filed Jun. 16, 2009, which was published in accordance with PCT Article 21(2) on Jan. 14, 2010 in English and which claims the benefit of European patent application No. 08305275.3, filed on Jun. 17, 2008.

FIELD OF THE INVENTION

The present invention relates generally to digital content distribution, and in particular to content distribution in content distribution networks such as peer-to-peer networks.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

There are today many different kinds of content distribution networks, such as for example Peer-to-Peer (P2P) networks that hereinafter will be used as a non-limitative example.

Figure 1:
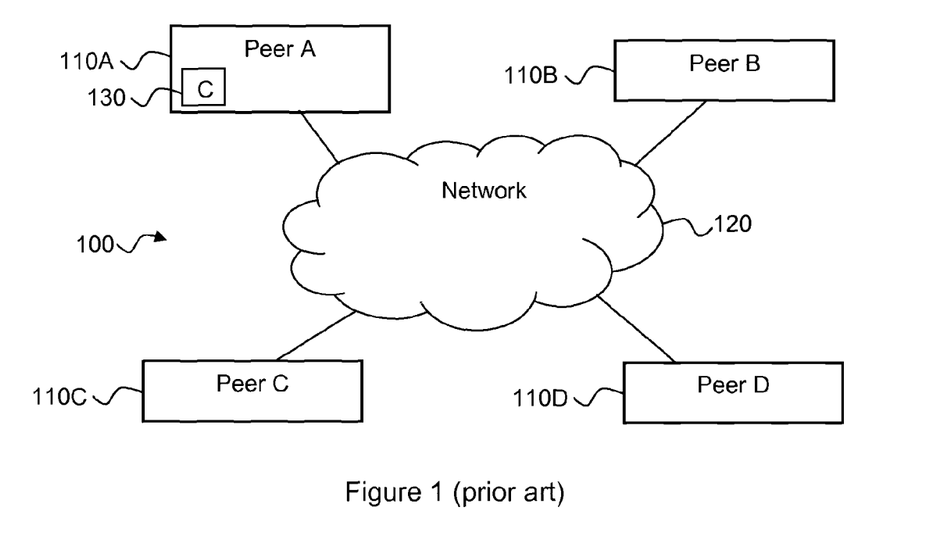
FIG. 1, already described, illustrates a typical prior art content distribution network.

FIG. 1 illustrates a typical prior art P2P network 100. The P2P network 100 comprises a plurality of peers 110A-110D (that may share reference number 110 when referred to as a group), functionally connected through a network 120, which commonly is the Internet. A first peer 110A stores a content 130 that it is willing to share with the other peers 110B-110D in the P2P network 100. Without going into specific details of just how a peer 110 may detect content on another peer 110, the other peers 110B-110D may download the content from the first peer 110 A.

It is possible that a large number of other peers want to download the content from the first peer 110A. However, when a peer has downloaded one part of a content file, it can share this part with further peers that then may download the part from either the first peer 110A or the peer that just downloaded the part. It will be appreciated that this system can reduce the load of a peer that initiates the content in the network 100. The more peers that download a content file, the more peers may offer the content file to further peers, which means that the system can be easily scalable to a large number of peers.

An intrinsic problem is the initial seed of content. In standard use of a P2P network 100, when a new file is shared by the first peer 100A, the number of peers that request the new file increases slowly, which means that first peer (also called "initial seeder") only serves few peers. Then, once the demand for the content has grown, a plurality of peers has already downloaded the content and can redistribute it. The bootstrap is thus slow. This is particularly problematic in the case of fresh content or pseudo-live content, i.e. content distributed with a small time shift. In "Incentives Build Robustness in BitTorrent", 2003, Bram Cohen proposes a solution that gives priority to the download of the content file that is the least widely distributed of the requested content files. This solution mitigates the problem, but does not solve it, but it does not encourage sharing of the downloaded file.

Greedy behaviour worsens this problem: some peers want to download the content without participating in its redistribution. If too many peers behave this way, then the P2P network is not able to scale up well to the point where P2P technology is efficient. In "An Incentive Mechanism for P2P Networks", $24^{th}$ International Conference of Distributed Computing Systems (ICDCS'04), IEEE Computer Society, 1063-6927/04, Richard Ma et al. provide an incentive mechanism for partially limiting the greedy behaviour by giving those who participate in the redistribution priority in the queue of uploaders. Another such solution is described in EP 1752925 in which each peer has a credit value that is increased when content is uploaded from the peer and decreased when the peer downloads content. These solutions also mitigate the problem but do not solve it.

The so-called flash crowd behaviour further worsens this problem. This happens when new content, which is much sought after, is shared and a great number of peers try to download it at essentially the same time. The initial peer cannot respond to all requests. Existing incentive mechanisms do not help much in this case.

It will therefore be appreciated that there is a need for a solution that can allow to reduce the overload of the initial seeder and to encourage peers to offer upload bandwidth for other peers. This invention provides such a solution.

SUMMARY OF THE INVENTION

In a first aspect, the invention is directed to a system for content distribution in a network. The network comprises at least one sharing node storing a content item associated with an access requirement value, the at least one sharing node comprising means for sharing the content item; and at least one requesting node associated with a counter value, the at least one requesting node comprising means for requesting the content item and means for downloading the content item. The system further comprises means for comparing the counter value of the at least one requesting node with the access requirement value for the content item to determine if the at least one requesting node is allowed to download the content item and means for modifying the access requirement value associated with the content item stored on at least one of the at least one sharing nodes as the number of sharing nodes changes.

In a first preferred embodiment, the system further comprises a central server adapted to: receive a request for the content item from the at least one requesting node; verify that the counter value of the at least one requesting node allows access to the content item; and, if so, return to the at least one requesting node an authentication item intended to be forwarded by the at least one requesting node to the at least one sharing node. It is advantageous that the central server is further adapted to store the access requirement value associated with the content item stored on the at least one sharing node. It is also advantageous that the central server is further adapted to store the counter value of the at least one requesting node.

In a second preferred embodiment, the access requirement value is comprised in an access rule that associates a plurality of access requirement values with an equal plurality of time periods, and wherein the modifying means is adapted to modify the access requirement value when the time period associated with a certain access requirement value has arrived.

In a second aspect, the invention is directed to a server in a system for content distribution in a network. The server comprises means for storing an requirement value associated with a content item stored on at least one sharing node in the network; means for receiving from a requesting node a request for the content item; means for comparing a counter value of the requesting node with the access requirement value for the content item to determine if the requesting node is allowed to download the content item; means for returning to the at least one requesting node an authentication item intended to be forwarded by the at least one requesting node to the at least one sharing node; and means for modifying the access requirement value associated with the content item as the number of sharing nodes storing the content item changes.

In a first preferred embodiment, the server further comprises means for storing the counter value of the requesting node.

In a second preferred embodiment, the server further comprises means for counting the number of sharing nodes for a content item in the network.

In a third aspect, the invention is directed to a method for content distribution in a network. A requesting node sends a request for a content item. A counter value associated with the requesting node is compared with an access requirement value for the content to determine if the requesting node may download the content item. If so, the requesting node downloads the content item from a sharing node in the network; and the access requirement value associated with at least one content item stored in the network is modified as the number of sharing nodes storing the content item changes.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

Figure 2:
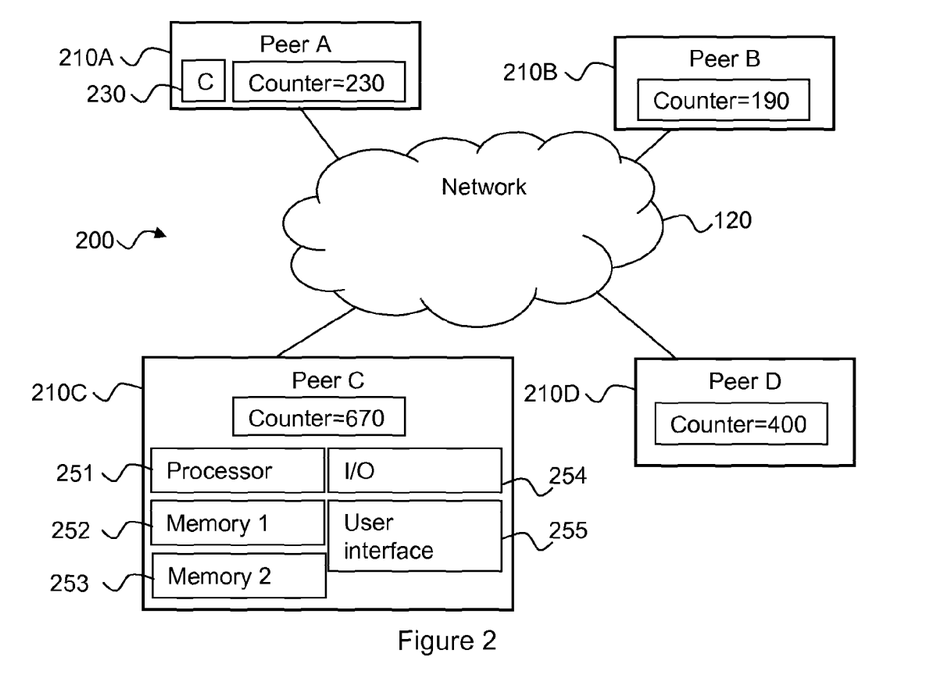
FIG. 2 illustrates a content distribution network according to a preferred embodiment of the invention.

FIG. 2 illustrates a content distribution network according to a preferred embodiment of the invention. As a non-limitative example, the content distribution network is a P2P network 200. The P2P network 200 comprises a plurality of peers 210A-210D (that may be jointly referred to as 210) functionally connected by a network 120, that advantageously is the Internet. Peer A 210 A stores a content file 230 that it is willing to share with the other peers 210B-210D.

Peer C comprises a processor 251 adapted to execute computer programs, in particular a peer application necessary for partaking of the P2P network; a first memory 252 adapted to for short-term storage of for example intermediary calculations performed by the processor 251; a second memory 253 adapted for long-term storage of for example content; a communication unit (I/O) 254 adapted for communication with other devices; and a user interface 255 adapted for interaction with a user. For the sake of clarity, only those parts of Peer C that may be necessary for comprehension of the invention are shown; and these parts are only shown for Peer C, while it is to be understood that the other peers may comprise at least some of these parts.

Each peer 210 is associated with a counter that preferably is stored locally, but that may also be stored centrally. The counter is intended to reflect the probability that a peer distributes content. One exemplary method of calculating the counter is to increase the counter for a peer when it uploads sharing files to at least one other peer, preferably in relation to the size of the uploaded content such as the number of megabytes. In other words, the more a peer shares content, the more the counter increases. It is preferred that the counter refers to a limited period of time, such as for example the previous month.

In FIG. 2, the peers 210 have the following exemplary counters: Peer A, 230; Peer B, 190; Peer C, 670; and Peer D, 400.

Each, or at least one, content file 230 shared by a peer is associated with access rules that at least stipulate the minimum counter value that a peer must have in order to download the content file 230. It is advantageous that the minimum counter value is linked to at least one factor other than the size of the content file. It is preferred that the minimum counter value is chosen so as to allow a certain percentage (within reasonable error margins) of the peers 210 access to the content, such as for example 30% of them. Using, for example, the size of the content file as a minimum counter value, as is done in the prior art, is not sufficient as it is quite inefficient for combating the flash crowd problem, in particular for small content files.

The person skilled in the art will appreciate that the access rules may also comprise different minimum counter values for different peers or group of peers.

It will thus be appreciated that the access rules are not a pure business feature as it may be used to allow access to the content to peers that have a history of participating in the distribution of content. As such, the likelihood of quicker content distribution in the network is increased.

The access rules may for example stipulate that a counter value of 500 is needed at all times to download the content file 230. It is also possible for the access rules to state that a counter value of 500 is needed before a certain time, 400 before a second time, and 0 (i.e. anyone may download the content file) after that. The access rules are preferably stored in the metadata of the content file 230 and they may be expressed as a list of vectors: <time, minimum counter value needed>.

When a peer wants to download content file 230, it sends a query comprising its counter value and an identifier of the content 230. A peer that receives this query controls that the counter value provides access to the content, as stipulated in the access rules.

It will be appreciated that the invention may also be implemented using a server (not shown) that distributes tokens. The server receives the request for the content, checks against the access rules that the counter value of the peer is high enough to download the content file and, if so returns a token that the peer may use to prove the authorization to download the content to another peer from which the content may be uploaded.

It will be appreciated that the invention may further be implemented using a server that keeps track of the counter values of the peers. In this case, the request received by the sharing peer 210A need not comprise the counter value, and the sharing peer may demand, from the server, confirmation that the counter value is correct.

Using the access rules, it is made more likely that only peers that have a habit of sharing downloaded content, i.e. participating in the content distribution, are able to download the content when it appears in the network 200. As it is then likely that the number of peers that distribute the content increases, it is likely that the distribution of the content is helped.

The invention is suitable for use with any kind of distributed content, but it is particularly suited for use with "fresh" contents or pseudo-live contents. Pseudo-live content is a stream distributed with a small time shift as compared to the corresponding live content.

It can thus be seen that the present invention provides a solution that can avoid bandwidth overload of the initial seeder as fewer peers may download an item of content, and that the present invention can incite peers to share downloaded files, thereby helping in the distribution of the content.

Figure 3:
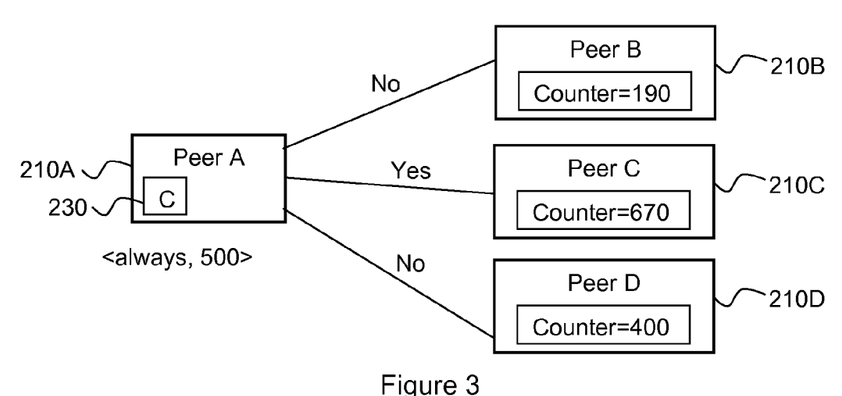
FIGS. 3-5 illustrate examples of file distribution using the preferred embodiment of the invention.
Figure 4:
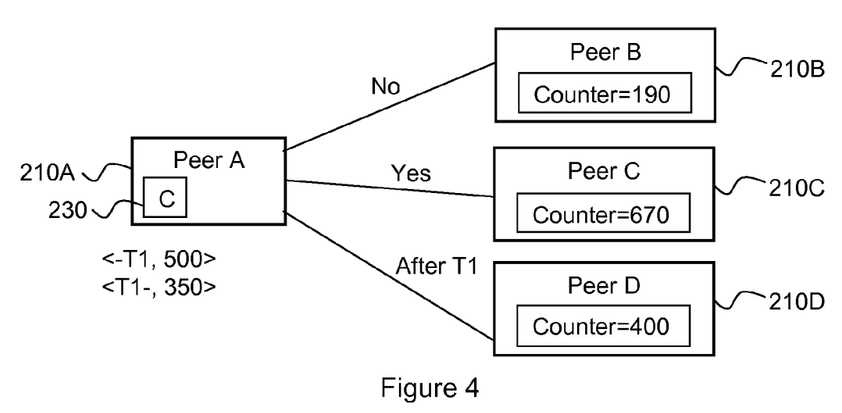
Figure 5:
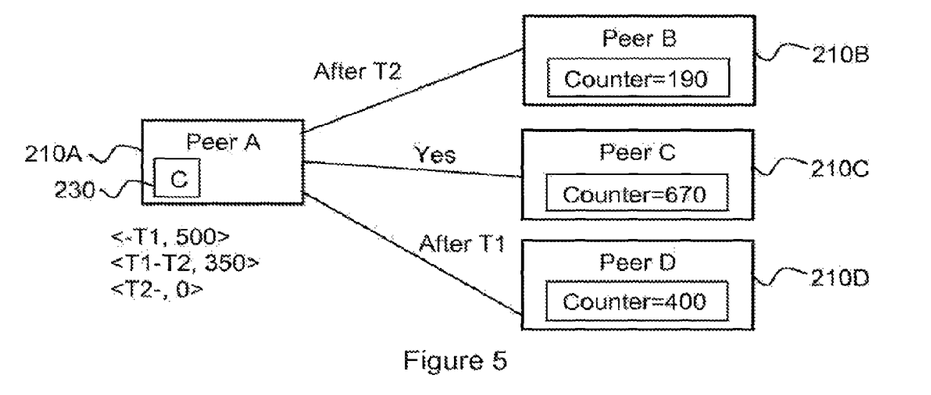

FIGS. 3-5 illustrate examples of file distribution using the preferred embodiment of the invention. The Figures illustrate the peers 210 shown in FIG. 2. Peer A 210A has a content file 230 that the other peers 210B-210D wish to download. The counter value of Peer A 210A is not shown as it is irrelevant in the examples.

In FIG. 3, the access rules <always, 500> indicate that a peer must have a minimum counter value of 500 in order to download the content, no matter when the peer wishes to download the content. As can be seen, only peer C 210C has a counter value that is sufficiently high (670), so it may download the content (Yes).

The counter values of Peers B and D 210B, 210D are not sufficiently high (190 and 400, respectively) so they may not download the content (No).

In FIG. 4, the access rules <-T1, 500> <T1-, 350> indicate that up until time T1, a peer must have a minimum counter value of 500 in order to download the content; after T1, a counter value of 350 suffices. As can be seen, only Peer C 210C has a counter value that is sufficiently high (670) to download the content at any time (Yes). Peer D, with its counter value of 400, may download the content after time T1 (After T1), but a counter value of 190 does not allow Peer B to download the content at any time (No).

In FIG. 5, the access rules <-T1, 500> <T1-T2, 350> <T2-, 0) indicate that up until time T1, a peer must have a minimum counter value of 500 in order to download the content; between times T1 and T2, a counter value of 350 suffices; and after T2 anyone may download the content, as the needed counter value is 0. As seen in FIG. 4, Peer C may download the content at any time and Peer D may do so any time after time T1. With its counter value of 190, Peer B may only download the content after time T2 (After T2).

Figure 6:
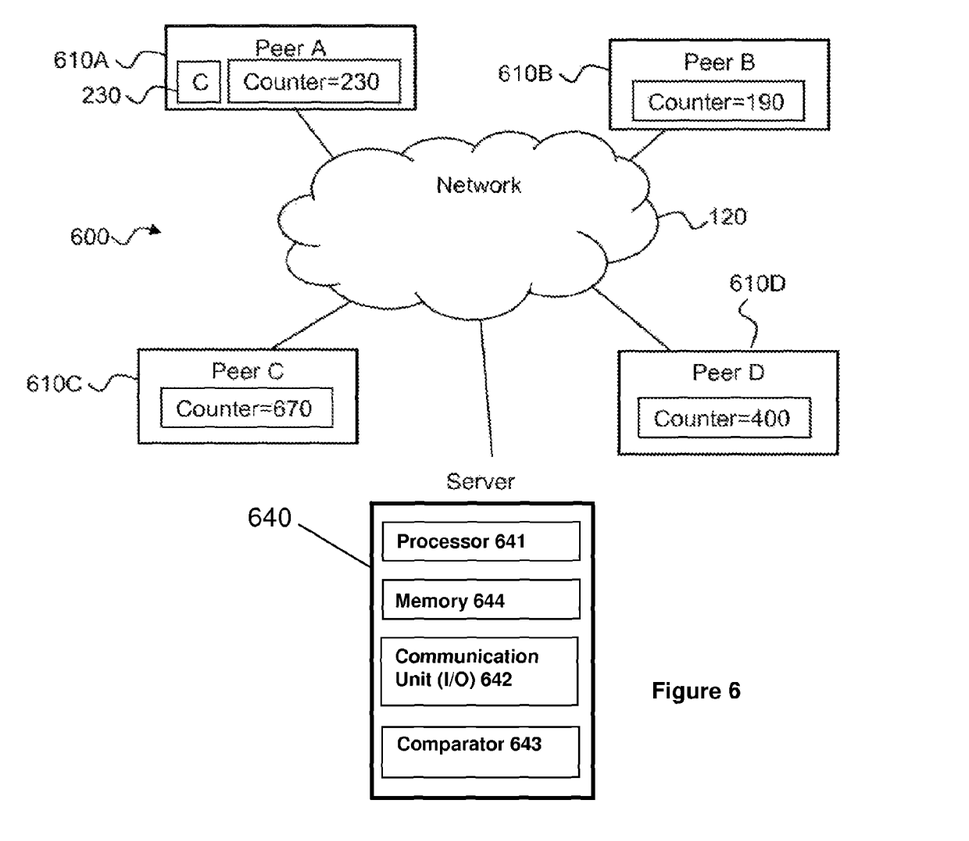
FIG. 6 illustrates an alternative embodiment of the invention.

FIG. 6 illustrates an alternative embodiment of the invention, particularly suitable for a system using one or more centralised servers. The content network comprises at least one central server 640 including a processor 641 and communication unit (I/O) 642 adapted to receive requests for content from peers 610 (which individually may be reference 610A-610D). The server 640 stores information in a memory 644 about the content in the network 600, such as what content is available from what peers and what the access rules are. In a preferred embodiment, a peer 610 informs the server 640 about any changes in the content it offers, and also when it goes off-line or comes on-line again. That way, the server 640 may have updated content information at all items. The server 640 preferably comprises at least some of the functional parts of Peer C, as described hereinbefore; it will be appreciated that the functionality need not be exactly identical.

As described hereinbefore, a peer 610 that wants to download an item of content 630 sends a request to the server 640. The request comprises an identifier of the content and the counter value for the peer 610. The server 640 looks up the information associated with the content and retrieves the access rules. Then, the server via comparator 643 compares the counter value and the access rules to see if the peer 610 is authorized to download the content. If so, then the server 640 via communication unit 642 returns a ticket that the peer 610 may send in order to prove that it is allowed to download the content along with metadata for the content.

In a variant solution, the server 640 stores the counter values of the peers 210, which means that it is not necessary for a peer to include this in the request.

It will be appreciated that more than one peer 610 may store the same content 630. In the alternative embodiment, the access rules may be different depending on the storing peer.

This arrangement makes it possible to lower the required counter value as the number of sharing peers increases.

One way of doing this, is for the server 640 to keep track of the number of sharing peers, provided that each sharing peer reports that it shares new content to the server 640. For example, the access rules may stipulate that a counter value of 500 is needed to download content that is shared by a single peer, 490 if two peers share the content, and so on. It is naturally also possible to keep the access rules of 500 for the originating peer and to set the access rules to 480 for the first new sharing peer and so on.

Another way of doing this is for the sharing peer to modify the metadata of the content file that it shares. If, for instance its own access rules state that a counter value of 500 is needed to download a file from the seeder, it may modify the access rules before uploading the content so that a counter value of 450 is needed to download the content from the peer that downloaded the content from the seeder. It is advantageous that the new sharing peer informs the server 640 that it shares the content and what the access rules are for downloading the content from the new sharing peer.

An advantage of using different access rules for different sharing peers is that it can make it possible to take the load off the seeder, since more peers will seek to download the content from peers that have a lower counter value requirement than that of the seeder.

Figure 7:
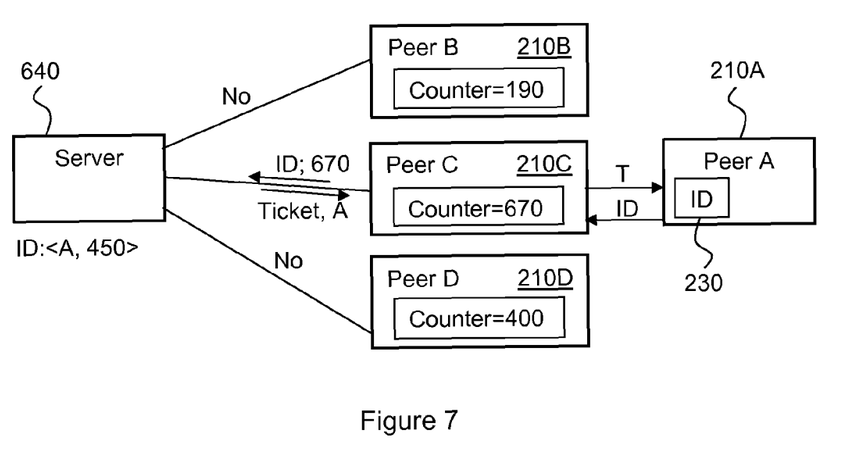
FIGS. 7-8 illustrate an example of content distribution using the alternative embodiment of the invention.
Figure 8:
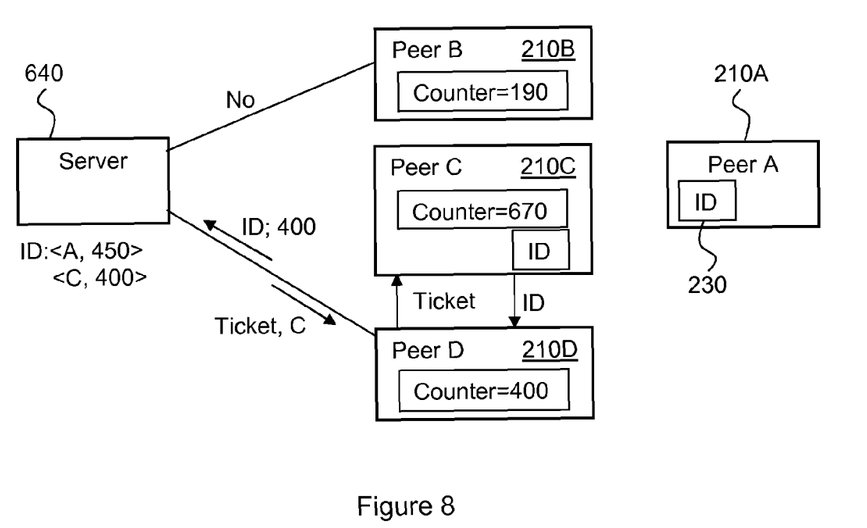

FIGS. 7-8 illustrate an example of content distribution using the alternative embodiment of the invention. FIG. 7 illustrates how the server 640 keeps information ID:<A, 450> that indicates that Peer A shares the content identified by ID and that a minimum counter value of 450 is needed to download the content. As Peer B and Peer D do not have the requisite counter value, they cannot download the content. However, Peer C, with a counter value of 670 may do so. Peer C sends a request to the server 640, the request comprising an identifier of the content (ID) and the counter value of Peer C (670). As this is sufficient to be able to download the content, the server 640 returns a ticket for the content, indicating that Peer C may download the content from Peer A (Ticket, A). In one embodiment, the ticket is valid only for download from Peer A; in another embodiment, the ticket comprises the counter value of the requesting peer, while the indication of the location of the content is just for information to Peer C. Peer C may then send the ticket (T) for the content to Peer A and may then download the content (ID) in return.

Although not illustrated in the Figure, it should be noted that the counter value of Peer A may be increased upon upload of the content to Peer C. In addition, as mentioned hereinbefore, it is advantageous that Peer C informs the server 640 that it is willing to share the content.

In FIG. 8, Peer C is also willing to share the content ID, and the server 640 has updated the information regarding the content to ID:<A, 450> <C, 400>, indicating that a counter value of 450 is still needed to download the content from Peer A, but that 400 is sufficient to download the content from Peer C. As Peer B only has a counter value of 190, it may not download the content at all. However, Peer D, with a counter value of 400 may now download the content from Peer C. To do so, it sends a request to the server 640 that returns a ticket for the content on Peer C, and Peer D forwards the ticket to Peer C and may then download the content therefrom.

It is naturally possible to combine the embodiments in order to have a system in which the necessary counter values may be different for each sharing peer and in which the necessary counter value for each sharing peer may vary as the time passes.

As will be appreciated the present invention can allow a positive effect on bandwidth as peers that download the content are encouraged to share it, which can reduce the startup delay, and as the incentive status can be used as an input for the peer selection function so that peers with high incentive status can be given higher chances of being selected.

By allowing early content access to only those peers that have are likely to share well, the inventions provides high bootstrap capacity that prior art strategies cannot provide.

It will therefore be appreciated that the present invention provides a solution that can allow to reduce the overload of the initial seeder and to encourage peers to offer upload bandwidth for other peers.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A system for content distribution in a network, comprising:
   at least one sharing node including a processor for storing a content item associated with an access requirement value in a memory, the at least one sharing node comprising a communication unit for sharing the content item, wherein the access requirement value stipulates a minimum counter value that a peer must have in order to download the content item, and wherein the access requirement value is independent of a number of requests;
   at least one requesting node including a processor that is associated with a counter value, the processor of the at least one requesting node requesting the content item and downloading the content item;
   wherein the processor of the at least one sharing node further comprises a comparator for comparing the counter value of the at least one requesting node with the access requirement value for the content item to determine if the at least one requesting node is allowed to download the content item;
   wherein the processor of the at least one sharing node modifies the access requirement value associated with the content item stored on at least one of the at least one sharing nodes as the number of sharing nodes changes;
   wherein the counter value reflects the probability that the requesting node will distribute the content item, and wherein the at least one requesting node is allowed to download the content item in case the counter value is greater than the access requirement value.

2. The system of claim 1, further comprising a central server adapted to:
   receive a request for the content item from the at least one requesting node;
   verify that the counter value of the at least one requesting node allows access to the content item; and, if so, return to the at least one requesting node an authentication item intended to be forwarded by the at least one requesting node to the at least one sharing node.

3. The system of claim 2, wherein the central server is further adapted to store the access requirement value associated with the content item stored on the at least one sharing node.

4. The system of claim 2, wherein the central server is further adapted to store the counter value for the at least one requesting node.

5. The system of claim 1, wherein the access requirement value is comprised in an access rule that associates a plurality of access requirement values with an equal plurality of time periods, and wherein the processor is adapted to modify the access requirement value when the time period associated with a certain access requirement value has arrived.

6. The system of claim 1, wherein the access requirement value is chosen so as to allow a certain percentage of the at least one requesting node access to the content item.

7. A server in a system for content distribution in a network, the server comprising:
   a processor for storing an access requirement value associated with a content item stored on at least one sharing node in the network in a memory, wherein the access requirement value stipulates a minimum counter value that a peer must have in order to download the content item, and wherein the access requirement value is independent of a number of requests;
   a communication unit for receiving from a requesting node a request for a content item;
   a comparator for comparing a counter value of the requesting node with the access requirement value for the content item to determine if the requesting node is allowed to download the content item, wherein the counter value reflects the probability that the requesting node will distribute the content item;
   the communication unit returning to the at least one requesting node an authentication item intended to be forwarded by the at least one requesting node to the at least one sharing node only if the counter value is greater than the access requirement value; and
   a processor for modifying the access requirement value associated with the content item as the number of sharing nodes storing the content item changes.

8. The server in claim 7, wherein the memory stores the counter value for the requesting node.

9. The server of claim 7, wherein the processor counts the number of sharing nodes for a content item in the network.

10. The server of claim 7, wherein the access requirement value is chosen so as to allow a certain percentage of the at least one requesting node access to the content item.

11. A method for content distribution in a network, the method comprising the steps of:
   sending, by a requesting node in the network, a request for a content item;
   comparing a counter value associated with the requesting node and an access requirement value for the content item to determine if the requesting node may download the content item, wherein the counter value reflects the probability that the requesting node will distribute the content item, wherein the requesting node is allowed to download the content item only if the counter value is greater than the access requirement value, and wherein the access requirement value stipulates a minimum counter value that a peer must have in order to download the content item, and wherein the access requirement value is independent of a number of requests;

downloading, by the requesting node, the content item from a sharing node in the network; and modifying the access requirement value associated with at least one content item stored in the network as the number of sharing nodes storing the content item changes.

* * * * *